United States Patent [19]

Loo

[11] 4,264,553
[45] Apr. 28, 1981

[54] METHOD OF UNDERWATER GRANULATION

[75] Inventor: Hans K. Loo, The Hague, Netherlands

[73] Assignee: Shell Oil Company, Houston, Tex.

[21] Appl. No.: 883,081

[22] Filed: Mar. 3, 1978

Related U.S. Application Data

[63] Continuation of Ser. No. 618,088, Sep. 30, 1975, abandoned.

[30] Foreign Application Priority Data

Apr. 30, 1974 [GB] United Kingdom ............... 42347/74

[51] Int. Cl.³ .............................................. B28B 11/10
[52] U.S. Cl. .................................... 264/142; 264/169; 425/313
[58] Field of Search ................ 264/142, 169; 425/464, 425/382, 382.2, 313

[56] References Cited

U.S. PATENT DOCUMENTS

| | | | |
|---|---|---|---|
| 3,206,529 | 9/1965 | Heijnis | 264/178 F |
| 3,308,507 | 3/1967 | Black | 425/311 |
| 3,372,215 | 3/1968 | Murhead et al. | 264/142 |
| 3,436,449 | 4/1969 | Trey et al. | 264/142 |
| 3,516,120 | 6/1970 | Braun et al. | 425/311 |
| 3,599,285 | 8/1971 | Hamilton | 425/313 |
| 3,599,286 | 8/1971 | Karet | 425/464 |
| 3,605,187 | 9/1971 | Wursten et al. | 264/142 |
| 3,749,536 | 7/1973 | Remichard et al. | 425/464 |
| 3,981,959 | 9/1976 | Cuff | 264/142 |
| 4,112,039 | 9/1978 | Cuff | 264/142 |

FOREIGN PATENT DOCUMENTS

| | | | |
|---|---|---|---|
| 1964884 | 7/1971 | Fed. Rep. of Germany | 264/169 |
| 44-2492 | 2/1969 | Japan | 264/169 |
| 44-7143 | 3/1969 | Japan | 425/382 |

Primary Examiner—Jay H. Woo

[57] ABSTRACT

A process for extruding and granulating thermoplastic material comprises passing a thermoplastic melt through a face-cut extruder or melt pump having an insulated die plate where the insulated die plate consists of a die plate having on its face or as an integral part of the die plate which is in contact with the cooling liquid a member or portion having a plurality of cavities or pores which surround the extrusion holes, the cavities or pores being of a type that communicate with the cooling liquid. Also disclosed is the thermoplastic processing apparatus.

5 Claims, 4 Drawing Figures

METHOD OF UNDERWATER GRANULATION

This is a continuation, of application Ser. No. 618,088, filed Sept. 30, 1975. now abandoned.

BACKGROUND OF THE INVENTION

The invention is directed to a process for extruding and granulating thermoplastic material. A conventional process for extruding and granulating or pelletizing plastic material comprises extruding a thermoplastic through an extrusion die including a die plate which on its face is provided with an insulation member, the die plate being provided with extrusion holes for the extrusion therethrough of thermoplastic material. If granulation is desired, a rotatably mounted knife is provided adjacent to the face of the extrusion die for cutting the material extruded through the extrusion holes into granules. The thermoplastic material is supplied to the extrusion die by an extruder, usually of the worm screw type, which presses the material in heated and molten condition through the extrusion holes. The die plate may be heated by steam, hot oil or electricity for maintaining the passing thermoplastic material at the required extrusion temperature. If it is desired to pelletize the material, the extruded material, on leaving the extrusion holes in the form of strands, is cut into small particles by a knife sweeping over the face of the die, and the extrudate is cooled to its solidification temperature by contact with a cooling liquid.

The cooling liquid, normally water, is supplied by spraying or pouring it over the face of the die, or the die is positioned with its face in contact with water contained in a water chamber. To avoid undue cooling of the hot die by the cooling water, the die plate may be thermally insulated by the provision of insulating material on its face. A common material used for this purpose is ceramic material, but this and various other insulation materials are not always very satisfactory for a number of reasons. Ceramic material is relatively weak and fragile, and therefore vulnerable. When the die has been in operation for some length of time, parts of the layer of ceramic material may have broken out, and repair or replacement of the layer becomes necessary.

If the insulation layer has become damaged, the extrusion holes are not uniformly heated, and poorly insulated extrusion holes enhance the risk of "freezing" (solidification) of the thermoplastic material in the holes during operation.

This invention is a process and apparatus for extruding and granulating thermoplastics which gives excellent insulation and overcomes the problems associated with the use of face-cut pelletizers having conventional insulated dies by the use of an improved insulation member for the die plate.

SUMMARY OF THE INVENTION

The invention is a process for extruding and granulating thermoplastic material which comprises passing a thermoplastic material through an extruder or melt pump having an extrusion die including a die face plate which forms or is provided with an insulation member, the die plate being provided with extrusion holes for the extrusion therethrough of melted thermoplastic material, and a rotatably mounted knife adjacent the face of the extrusion die for cutting the material extruded through the extrusion holes into granules. The insulation member or modified die face plate is characterized by the presence, at least in the regions adjacent the extrusion holes, of small cavities or pores in the insulation member and or between the insulation member and die plate or in the face of the die plate. These cavities communicate with the cooling liquid and are capable of containing a gas or vapor during operation of the process.

DESCRIPTION OF THE PREFERRED EMBODIMENTS

A thermoplastic material is extruded as a melt through an extruder having an insulated die head with a plurality of extrusion holes in its face and a knife which is repeatedly passed across the face of the die head so as to cut the strands of exiting thermoplastic material into pellets or granules as they come into contact with a cooling medium. The insulation for the die head is a plurality of small cavities which at least surround the extrusion holes on the face of the die head. These cavities communicate with the cooling liquid and are filled with a gas or vapor during operation of the extruder and/or pelletizer and the gas or vapor formed therein serves as an insulation between the coolant and the metal in contact with the melt inside the extrusion holes.

The cavities which are in the face of the die head may be those incorporated as part of the die head or may be in a separate face attached to the face of the die head. Where a separable face is attached to the die head the pattern of extrusion holes in the separable face essentially corresponds to the pattern of extrusion holes in the die head.

While the material used to fabricate the conventional die face for a face-cut pelletizer is of a type that acts as an insulator, this need not be the case in the present invention. A plurality of cavities can be formed in an insulation material such as ceramics, but the preferred material for forming the face of the die wherein the face contains the plurality of cavities is a metal, preferably sintered metal, more preferably hardmetal such as tungsten carbide or sintered stainless steel. While these are preferred many other materials are acceptable.

The cavities or pores which are in open communciation with the coolant are of such a size that during operation of the extruder a vapor pocket is maintained therein. These cavities which are in the face of the die head or the separable face have a maximum diameter ranging from about 1 to about 5 millimeters, preferably from about 1 to about 3 millimeters and most preferably from about 1 to about 2 millimeters. These cavities can be either special rod-like, or cone-like and when rod or cone-like the length of the rod or cone can range from about 1 to about 20 millimeters, preferably about 1 to about 10 millimeters and most preferably about 1 to about 5 millimeters.

The density of the cavities can vary across the face of the die but is preferred that around the extrusion holes the number of cavities per square centimeter should range from about 10 to about 300, preferably from about 10 to about 100.

The cavities can be entirely open, i.e., all communicating with the coolant or some may be open and some closed. When there are both open and closed cavities, the preferred ratio of open to closed cavities is at least 1:1, more preferred is a ratio of at least 3:1 and even more preferred is a ratio of at least 8:1.

In a preferred embodiment of the apparatus according to the invention, the cavities are in open communication with the space in front of the extrusion die. This means that coolant, for example, water contacting the face of the die can enter the cavities. When the apparatus is in operation, the temperature of the die plate and at least the adjacent part of the insulation member is above the boiling point of the cooling water in the cavities, so that the water in the cavities quickly turns into steam. The steam-filled cavities form a very effective thermal insulation, whereby the walls of the extrusion holes and the thermoplastic material being extruded therethrough are maintained at a temperature high enough to keep the plastic material uniformly heated and flowable. By allowing some cooling water to enter the cavities and to evaporate therein, an essentially gaseous thermal insulation for the die plate is obtained in a simple and cheap fashion.

In an alternative embodiment of the apparatus of the invention, some of the cavities do not communicate with the space in front of the die. In this construction, the closed cavities are filled with an inert gas such as nitrogen or air, or the cavities are evacuated so that there is a vacuum inside them. The gas-filled or evacuated cavities are effective as a thermal insulation, but of course, they require sealing from the atmosphere or the surrounding water environment. For example, if the cavities are formed inside the insulation member, the surface area of the member must be fully closed to maintain the gas or the vacuum in the cavities.

Whether or not the cavities are to be open to the surrounding space, a suitable way of providing them is by making the insulation member wholly or partly as a body of porous material, the pores of this body forming the cavities. The porous body may consist of a material which is not itself a particularly good insulation material. For example, it may consist of sintered material such as sintered metal, or a sintered hardmetal such as the carbides (e.g. tungsten carbide). An example of a suitable material is sintered stainless steel, which is available as a commercial product and can be obtained in various forms, but many other materials are acceptable. The thickness of the porous insulation member, which is normally in the shape of a plate, should preferably be as small as permissible to achieve the desired insulation capacity, at least in the area where the extrusion holes are located. This thickness may be from 1 to 10 millimeters (mm); a thickness of about 3 mm should be satisfactory for many uses.

If some of the pores are to be closed from the exterior of the member, a coating of material can be sprayed or otherwise applied to encapsulate part of the porous body.

If the extrusion holes are to pass through the porous insulation member rather than setting the member into the area surrounding the extrusion holes, this member may comprise bushings of which the bores define the extrusion die holes. This arrangement may be chosen to provide a smooth inner wall for the extrusion die holes and to avoid the penetration of thermoplastic material into the porous body.

In an alternative design, the boundary walls of the cavities are formed in part by grooves or channels on the surface of the insulation member facing the die plate. Thus, the cavities are formed between these grooves or channels in the insulation member and the opposite face of the die plate, and again, the arrangement of grooves or channels may be such that part of the cavities do and part do not communicate with the area contacted by the coolant when the insulation member is mounted on the die plate. Instead of on the surface of the insulation member, the grooves or channels may be found on the surface of the die plate facing the insulation member.

In general, the number, shape, and arrangement of the cavities may vary widely within the limits set for this invention, i.e. the cavities should be capable of containing a gas or vapor when the apparatus is in use. However, in particular for the arrangement whereby the cavities are open to the ingress of cooling water, it will be useful to design cavities which are small in at least two mutually perpendicular directions. For example, if the cavities are in the form of bores in the insulation plate, these should be preferably of small diameter, and if the cavities are in the form of channels, these should be narrow and shallow.

If not found disadvantageous for other reasons, the insulation member may still consist of a material which is itself good thermal insulation, but since it is no longer a strict requirement in the apparatus of the present invention to make use of relatively weak insulating materials that have been common for applications of the present kind, the insulation member can be made of materials much less vulnerable to damage i.e., by passing knife blades. If desired or necessary, the area of the insulation member swept by the knives may be protected by the application thereon of a highly wear-resistant material, e.g. a coating or sheathing of tungsten carbide or chromium steel. The invention is particularly useful for the granulation of thermoplastic material requiring relatively high extrusion temperatures (and therefore high temperatures near the extrusion die holes). Materials of this kind are the polyolefins, in particular high-density polyethylene and polypropylene, which have a rather high melting temperature so that heating and therefore insulation requirements of the die plate to prevent freezing of the thermoplastic material in the extrusion holes are more stringent than for materials having a lower melting point.

The good insulation of the extrusion die obtainable in the apparatus of the invention permits a uniform supply and distribution of heat from the die plate to the zones around the die holes, resulting in a uniform extrusion of the thermoplastic material and preventing "freezing" thereof in the die holes. The improved insulation should also cut heat losses. Usually, the die is heated by steam supplied around the die plate, and the lower heat losses may permit the use of lower-pressure steam and therefore a lighter construction of the die. If the improved insulation allows the use of a thinner insulation member, the reduced length of the die holes and therefore the reduced flow resistance of these holes makes possible the use of lower extrusion pressures. If the insulation member is made of a porous material, a good bond is obtainable thereon by any desired surface layer applied on the face of the insulation member, such as a coating or sheathing of wear resistant material or of material to close the entries to some of the cavities.

While the insulated die face has been generally described in conjunction with a face-cut pellitizer, this type of insulated face will be useful in any extruder where the die is in direct contact with the coolant and could be used for example in strand cut pellitizers or for extruding profiles or films.

The invention will be explained further by way of example with reference to the accompanying drawings, in which.

Figure 1:
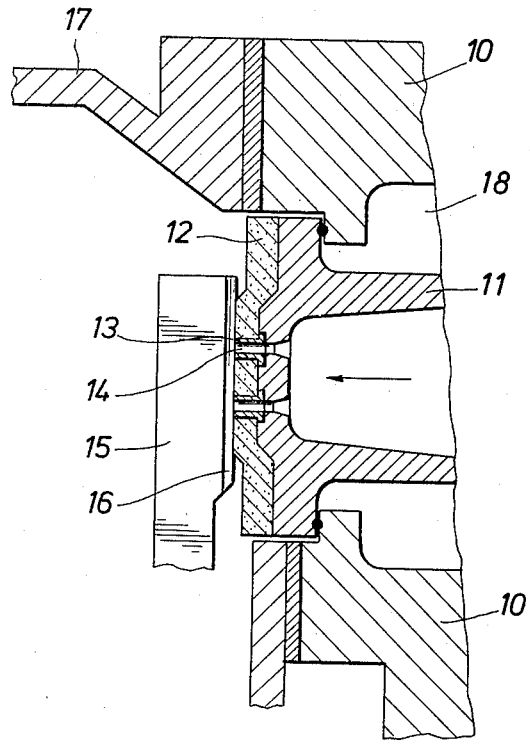
FIG. 1 is a sectional view of part of an apparatus in accordance with the invention.
Figure 2:
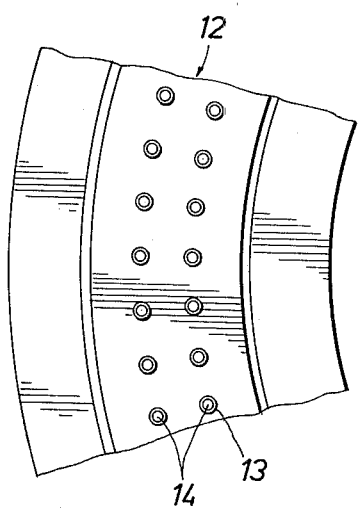
FIG. 2 is a front view of a segment of an insulation plate used in the apparatus of FIG. 1.

The apparatus of FIGS. 1 and 2 comprises an extrusion die housing 10 carrying a die plate 11. An insulation plate 12 is mounted on the face of the die plate 11. Bushings 13 are mounted in bores of the insulation plate, and a plurality of axially parallel extrusion die holes 14 are formed in the die plate 11 and by the bores in the bushings 13. Cutter knives 15 carrying knife blades 16 are mounted for driven rotational movement adjacent the face of the insulation plate 12. A coolant chamber 17 adapted to contain for example cooling water is connected sealingly to the housing 10. Cooling water can be supplied and withdrawn continuously from the chamber 17 by means not illustrated. Heating chambers 18 are formed between the housing 10 and die plate 11 for the passage of a heating fluid such as steam or hot oil around the die plate 11.

In use, the assembly is connected to an extruder which continuously presses a melt of synthetic thermoplastic material through the space in the die plate 11 and through the die holes 14. During passage through the die plate 11, the melt is maintained in a hot, fluid condition with the aid of heating fluid circulating around the die plate through the chambers 18. The thermoplastic material leaving the die holes in the form of strands is cut into nibs, grains or any other form of particles by the rotary knives passing along the face of the insulation plate. The extruded thermoplastic material is cooled to solidification temperature in the water contained in the chamber 17, and the solid thermoplastic particles are carried away in the effluent stream of water from the water chamber.

In accordance with the invention, the insulation plate in the example of FIG. 1 is formed as a porous body of stainless steel, about 3 mm thick in the region of the die holes (diameter of the die holes at their exit is about 2.2 mm). A thin hard metal cladding is provided on the face of the elevated portion of the illustrated insulation plate which is contacted by the knife blades; the cooling water in the water chamber has access to the interconnected pores of the insulation plate at the entire remaining exposed surface area of this plate, i.e. at the non-clad front and edges thereof. Any cooling water penetrated into the porous insulation plate turns immediately into steam by heat derived from the hot die plate, whereby the porous body becomes an effective thermal insulator.

Figure 3:
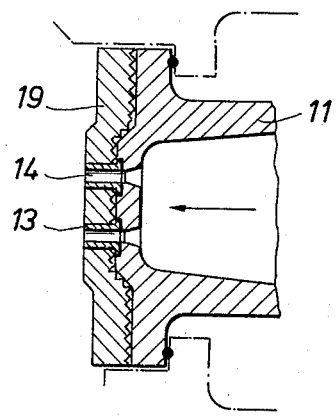
FIG. 3 shows the apparatus of FIG. 1 with a different insulation plate.
Figure 4:
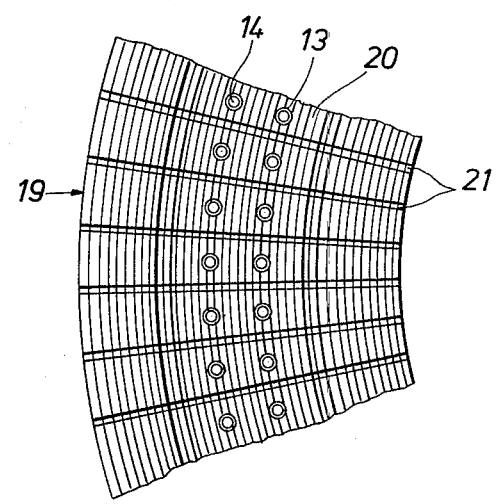
FIG. 4 is a rear view of a segment of the insulation plate used in the apparatus of FIG. 3.

In the embodiment shown in FIGS. 3 and 4, the insulation plate 19 is a solid body, of which the backside is provided with a series of concentric circular grooves 20 which are traversed by radial grooves 21 beginning at the edges of the plate so that all grooves are accessible to water from the water chamber 17.

I claim as my invention:

1. A method for pelletizing a thermoplastic material which comprises:
    (a) heating the thermoplastic material to a melt,
    (b) extruding the melt into a cooling liquid through nozzles penetrating a die plate, maintaining the temperature of the portion of the die plate surrounding said nozzles at a sufficiently high temperature, above the boiling temperature of said cooling liquid, to prevent chilling the thermoplastic below its solidification temperature by maintaining vapor of said cooling liquid in a plurality of small cavities, not contiguous to said nozzles, in said die plate, said cavities being in communication with said cooling liquid, and
    (c) slicing the thermoplastic material exiting through said nozzles by a knife means which periodically moves across the die face.

2. The process of claim 1, wherein said small cavities are open pores having a maximum diameter ranging from about 1 to about 3 millimeters and are present around said extrusion nozzles at a concentration of from about 10 to about 100 cavities per square centimeter.

3. The process of claim 1 where the part of the die face containing the cavities is metal.

4. The process of claim 3 where the coolant is water.

5. The process of claim 4 where the thermoplastic material is selected from the group consisting of polystyrene, polypropylene, polyvinylchloride, polyethylene and polystyrene/butadiene block copolymers or their partially hydrogenated derivatives.

* * * * *